US012625778B1

(12) United States Patent
Kumar

(10) Patent No.: US 12,625,778 B1
(45) Date of Patent: May 12, 2026

(54) DATA MANAGEMENT ACROSS CLOUD ENVIRONMENTS

(71) Applicant: Cohesity, Inc., San Jose, CA (US)

(72) Inventor: Anirudh Kumar, San Jose, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/427,562

(22) Filed: Jan. 30, 2024

(51) Int. Cl.
*G06F 11/14* (2006.01)

(52) U.S. Cl.
CPC ...... *G06F 11/1464* (2013.01); *G06F 2201/84* (2013.01)

(58) Field of Classification Search
CPC .......................... G06F 11/1464; G06F 2201/84
See application file for complete search history.

(56) References Cited

U.S. PATENT DOCUMENTS

2012/0151136 A1*   6/2012   Hay .................... G06F 11/1464
                                                        711/E12.001
2016/0139820 A1*   5/2016   Fluman .................. G06F 3/061
                                                        711/114
2020/0249958 A1*   8/2020   Suryanarayana ..... G06F 3/0659
2022/0245034 A1*   8/2022   Nara ...................... G06F 3/0619
2023/0033539 A1*   2/2023   Xu ....................... G06F 11/1092
2023/0195578 A1    6/2023   Lee

* cited by examiner

*Primary Examiner* — Janice M. Girouard
(74) *Attorney, Agent, or Firm* — Shumaker & Sieffert, P.A.

(57)                ABSTRACT

Techniques are described for data management across cloud environments. An example method comprises restoring, by the data platform, a selected copy of the one or more copies from the one or more second storage systems by, for each chunk of the selected copy: identifying, by the data platform, the chunk in the chunk metadata, determining, by the data platform, whether a matching chunk is stored on the first storage system based on the chunk metadata, responsive to determining the matching chunk is stored on the first storage system, retrieving, by the data platform, the matching chunk from the first storage system, wherein the matching chunk is included in the selected copy, and responsive to determining the matching chunk is not stored on the first storage system, retrieving, by the data platform, the chunk from the one or more second storage systems, wherein the chunk is included in the selected copy.

18 Claims, 9 Drawing Sheets

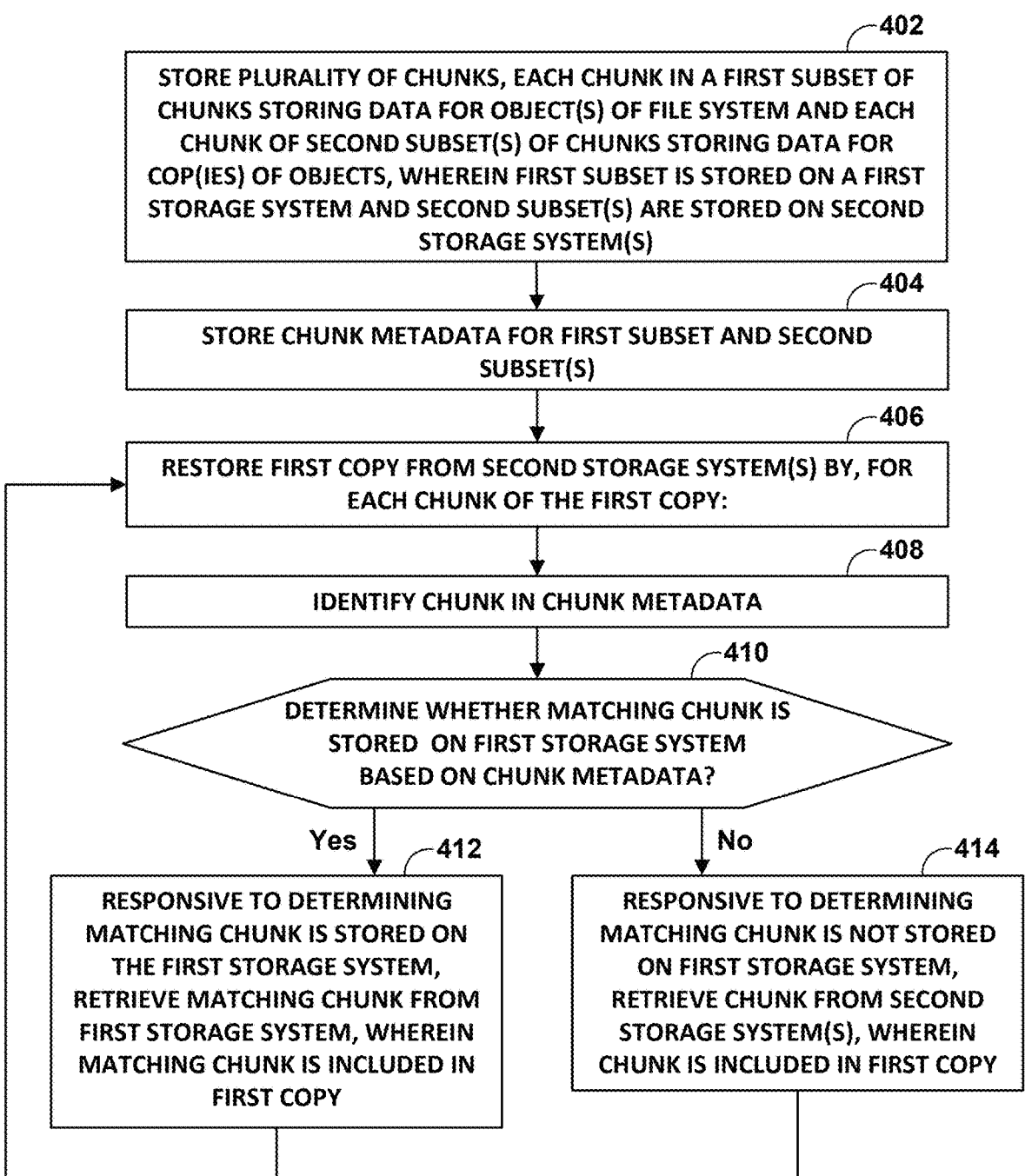

402

STORE PLURALITY OF CHUNKS, EACH CHUNK IN A FIRST SUBSET OF CHUNKS STORING DATA FOR OBJECT(S) OF FILE SYSTEM AND EACH CHUNK OF SECOND SUBSET(S) OF CHUNKS STORING DATA FOR COP(IES) OF OBJECTS, WHEREIN FIRST SUBSET IS STORED ON A FIRST STORAGE SYSTEM AND SECOND SUBSET(S) ARE STORED ON SECOND STORAGE SYSTEM(S)

404

STORE CHUNK METADATA FOR FIRST SUBSET AND SECOND SUBSET(S)

406

RESTORE FIRST COPY FROM SECOND STORAGE SYSTEM(S) BY, FOR EACH CHUNK OF THE FIRST COPY:

408

IDENTIFY CHUNK IN CHUNK METADATA

410

DETERMINE WHETHER MATCHING CHUNK IS STORED ON FIRST STORAGE SYSTEM BASED ON CHUNK METADATA?

Yes     412                              No     414

RESPONSIVE TO DETERMINING MATCHING CHUNK IS STORED ON THE FIRST STORAGE SYSTEM, RETRIEVE MATCHING CHUNK FROM FIRST STORAGE SYSTEM, WHEREIN MATCHING CHUNK IS INCLUDED IN FIRST COPY

RESPONSIVE TO DETERMINING MATCHING CHUNK IS NOT STORED ON FIRST STORAGE SYSTEM, RETRIEVE CHUNK FROM SECOND STORAGE SYSTEM(S), WHEREIN CHUNK IS INCLUDED IN FIRST COPY

FIG. 4

DATA MANAGEMENT ACROSS CLOUD ENVIRONMENTS

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

SUMMARY

Aspects of this disclosure describe techniques for data management across cloud environments, such as may be provided by public cloud service providers. Some data platforms exist in a hybrid cloud arrangement where data of a file system (e.g., a distributed file system) may be stored across various cloud environments. For example, a data platform may store data in a storage service within the cloud environment where the data platform resides (e.g., a primary copy, backup, or archive), while storing a copy (e.g., a secondary copy, backup, or archive) of the data in a storage service of one or more other cloud environments.

When a data platform in a first cloud environment reads data from a second cloud environment, data must egress the second cloud environment. For example, a data platform may store a selected copy of the data (e.g., a primary copy) in a first cloud environment (e.g., a primary cloud environment) and store one or more secondary copies of the data (e.g., secondary copies) in one or more distinct second cloud environments (e.g., a secondary cloud environment). In this example, the data platform may be deployed to or otherwise reside in the primary cloud environment and therefore no data egress occurs when the data platform accesses the primary copy.

Data egress may occur when a data platform accesses secondary copies, such as during regular operation or during restoration of a secondary copy of the primary copy. A primary copy may be substantial in size (e.g., hundreds of gigabytes (GBs) or more) thereby requiring an equally substantial amount of data for secondary copies. As such, when a data platform accesses data from another cloud environment (e.g., a secondary copy) an equal amount of data egress occurs. For example, to restore 500 GBs of data from a secondary copy, a data platform may retrieve 500 GBs of data from a secondary cloud environment thereby causing 500 GBs of data to egress the secondary cloud environment.

Data egress may incur various data access costs. For example, data egress may have costs related to latency and bandwidth as data is transmitted between cloud environments. Data egress may also be subject to monetary data access costs assessed by cloud environments, such as public cloud services. For example, some public cloud services may assess charges for API calls (e.g., $2.00 per 1 million API calls) and data egress (e.g., $1.00 per megabyte (Mb)). A data platform at a primary cloud service may therefore incur various data access costs when reading secondary copies at one or more secondary cloud services.

For example, to create a secondary copy, a data platform may read data from the primary cloud environment and store the data in the secondary cloud environment as the secondary copy. To restore the secondary copy, some data platforms may read the secondary copy entirely from the secondary cloud environment, which is subject to data access costs.

As will be described further herein, a data platform may store data of a file system in one or more chunks, where each chunk may represent a portion of the data. For example, a file system may comprise one or more files or other objects. The data platform may split the objects into one or more fixed or variable size chunks (e.g., 16-48 kilobytes (kB)) and store the objects as chunks in multiple cloud environments (e.g., in a hybrid cloud environment).

The techniques described herein provide data management across cloud environments to reduce or eliminate data access costs when utilizing multiple cloud environments for storage of data and one or more backups, archives, or other copies thereof. For example, rather than reading a secondary copy entirely from a secondary cloud service, in accordance with the disclosed techniques, a data platform at a primary cloud service may instead determine whether at least a portion of the secondary copy is available within a primary cloud service. Responsive to the determination, the data platform may retrieve the data unavailable within the primary cloud service from the secondary cloud services, thereby reducing or eliminating data egress and data access costs relative to the secondary cloud services.

Although the techniques described in this disclosure are primarily described with respect to a backup function of a data platform (e.g., restoring backups), similar techniques may be applied for an archive function (e.g., restoring archives) or other similar function of the data platform.

In one example, this disclosure describes a method comprising storing, by a data platform implemented by a computing system, a plurality of chunks, each chunk in a first subset of the plurality of chunks storing data for one or more objects of a file system and each chunk of one or more second subsets of the plurality of chunks storing data for one or more copies of the one or more objects, wherein the first subset is stored on a first storage system and the one or more second subsets are stored on one or more second storage systems, and storing, by the data platform, chunk metadata for the first subset and the one or more second subsets. The method includes restoring, by the data platform, a selected copy of the one or more copies from the one or more second storage systems by, for each chunk of the selected copy: identifying, by the data platform, the chunk in the chunk metadata, determining, by the data platform, whether a matching chunk is stored on the first storage system based on the chunk metadata, responsive to determining the matching chunk is stored on the first storage system, retrieving, by the data platform, the matching chunk from the first storage system, wherein the matching chunk is included in the selected copy, and responsive to determining the matching chunk is not stored on the first storage system, retrieving, by the data platform, the chunk from the one or more second storage systems, wherein the chunk is included in the selected copy.

In another example, this disclosure describes a computing system comprising a memory storing instructions, and processing circuitry that executes the instructions to: store a plurality of chunks, each chunk in a first subset of the plurality of chunks storing data for one or more objects of a file system and each chunk of one or more second subsets of the plurality of chunks storing data for one or more copies of the one or more objects, wherein the first subset is stored on a first storage system and the one or more second subsets are stored on one or more second storage systems, and store chunk metadata for the first subset and the one or more second subsets. The processing circuitry further executes the instructions to restore a selected copy of the one or more copies from the one or more second storage systems by, for each chunk of the selected copy: identify the chunk in the chunk metadata, determine whether a matching chunk is stored on the first storage system based on the chunk metadata, responsive to determining the matching chunk is stored on the first storage system, retrieve the matching chunk from the first storage system, wherein the matching chunk is included in the selected copy, and responsive to determining the matching chunk is not stored on the first storage system, retrieve the chunk from the one or more second storage systems, wherein the chunk is included in the selected copy.

In another example, this disclosure describes a computer-readable storage medium comprising instructions that, when executed, cause processing circuitry of a computing system to: store a plurality of chunks, each chunk in a first subset of the plurality of chunks storing data for one or more objects of a file system and each chunk of one or more second subsets of the plurality of chunks storing data for one or more copies of the one or more objects, wherein the first subset is stored on a first storage system and the one or more second subsets are stored on one or more second storage systems, and store chunk metadata for the first subset and the one or more second subsets. When further executed, the instructions cause the processing circuitry to restore a selected copy of the one or more copies from the one or more second storage systems by, for each chunk of the selected copy: identify the chunk in the chunk metadata, determine whether a matching chunk is stored on the first storage system based on the chunk metadata, responsive to determining the matching chunk is stored on the first storage system, retrieve the matching chunk from the first storage system, wherein the matching chunk is included in the selected copy, and responsive to determining the matching chunk is not stored on the first storage system, retrieve the chunk from the one or more second storage systems, wherein the chunk is included in the selected copy.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is a flowchart illustrating an example mode of operation for a data platform to perform data management across cloud environments, in accordance with techniques of this disclosure.

Like reference characters denote like elements throughout the text and figures.

DETAILED DESCRIPTION

Figure 1A:
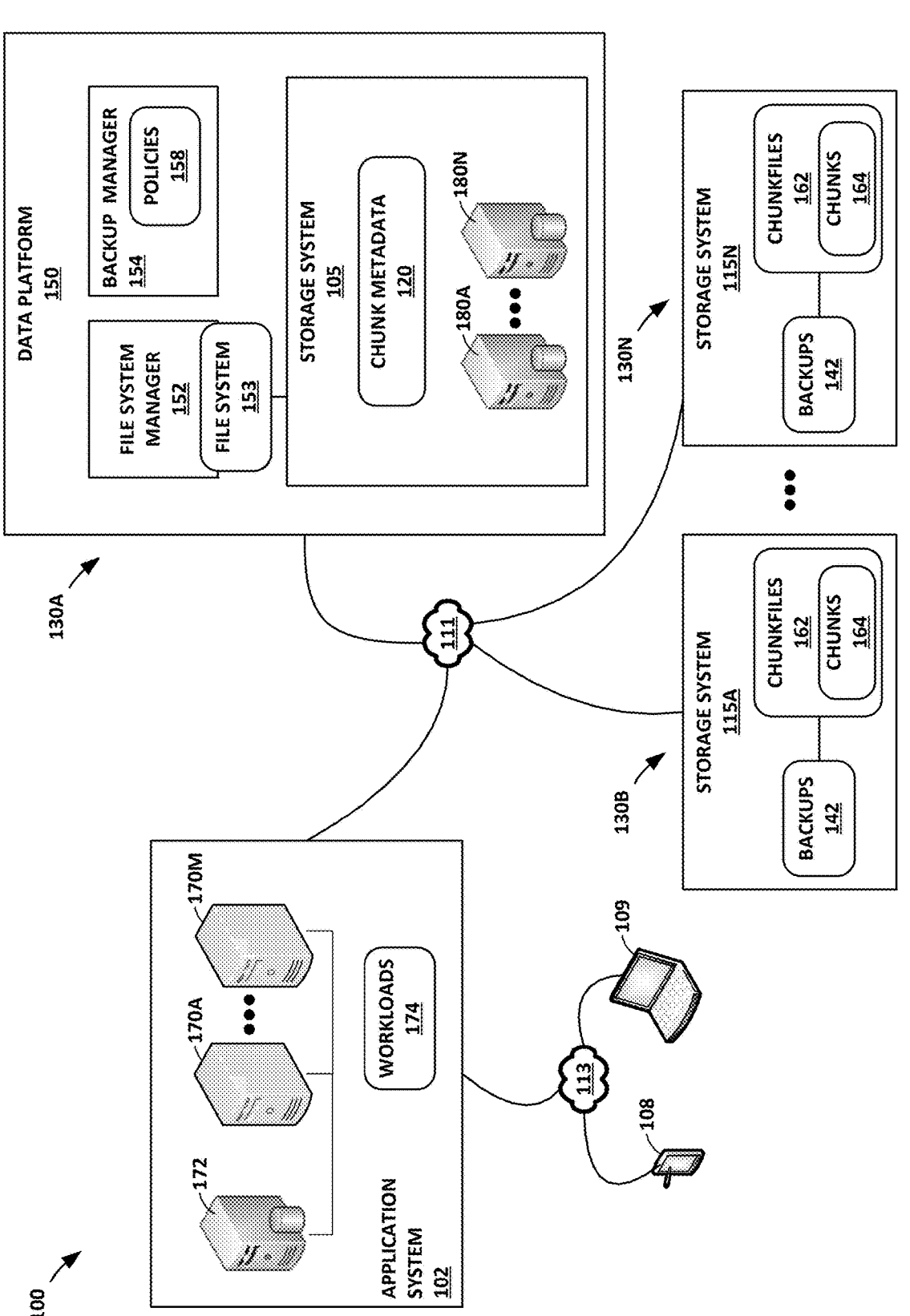
FIGS. 1A-1B are block diagrams illustrating example systems that perform data management across cloud environments, in accordance with techniques of this disclosure.
Figure 1B:
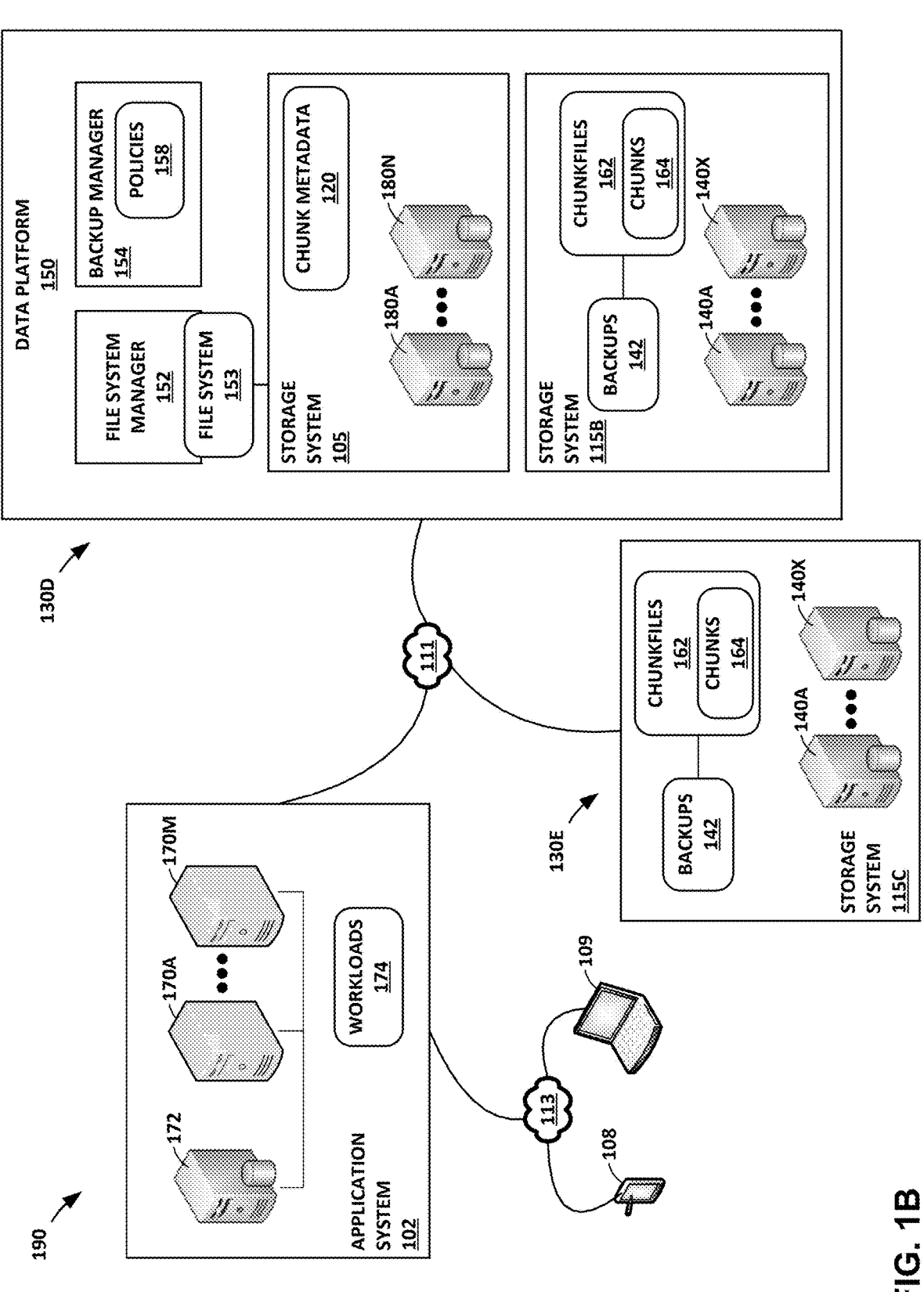

FIGS. 1A-1B are block diagrams illustrating example systems that perform data management across cloud environments, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and one or more separate storage systems 115A-115N. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and backup manager 154 in the example of system 100, and store objects and metadata for data platform 150 to storage media. In some examples, separate compute devices (not shown) execute software for data platform 150, such as file system manager 152 and backup manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Backups 142 created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/ storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," file system 153 for application system 102 may alternatively be referred to as a "source file system," and storage system 105 may alternatively be referred to as a "source storage system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes backup manager 154 that stores backups 142 of file system data for file system 153. In the example of system 100, backup manager 154 stores one or more backups 142 of file system data, stored by storage system 105, to one or more storage systems 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed at and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be referred to as an "external target" for backups 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on storage system 105 to support latency sensitive applications. However, because storage system 105 is often more difficult or expensive to scale, data platform 150 may use storage system 115 to support use cases such as backup and archive. In general, a file system backup is a copy of file system 153 to support protecting file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Backup manager 154 may backup file system data for file system 153 at any time in accordance with backup policies 158 that specify, for example, backup periodicity and timing (daily, weekly, etc.), which file system data is to be stored, a backup retention period, storage location, access control, and so forth. An initial backup 142 of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups 142 of the file system 153 may correspond to respective states of the file system 153 at respective subsequent backup creation times, i.e., after the backup creation time corresponding to the initial backup. A subsequent backup 142 may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored to storage system 115. File system data that is included in a subsequent backup may be deduplicated by backup manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, backup manager 154 stores file system data to storage system 115 as backups 142, using chunkfiles 162. Backup manager 154 may use any of backups 142 to subsequently restore the file system (or portion thereof) to its state at the backup creation time, or backup 142 may be used to create or present a new file system (or "view") based on backup 142, for instance. As noted above, backup manager 154 may deduplicate file system data included in a subsequent backup 142 against file system data that is included in one or more previous backups. For example, a second object of file system 153 and included in a second backup 142 may be deduplicated against a first object of file system 153 and included in a first, earlier backup. Backup manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object. In some examples, deduplication may only occur between a subset of backups 142, for example backups 142 stored on a particular storage service 115, such to allow independent backups to exist, or to confirm to one or more policies 158.

Backup manager 154 may apply deduplication as part of a write process of writing (i.e., storing) an object of file system 153 to one of backups 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, backup manager 154 can compute chunks having chunk sizes within the range of 16-48 kB. Backup manager 154 may eschew deduplication for objects that that are less than 16 kB. In some example implementations, when data of an object is being considered for deduplication, backup manager 154 compares a chunk identifier (ID) (e.g., a hash value of the entire chunk) of the data to existing chunk IDs for already stored chunks. If a match is found, backup manager 154 updates metadata for the object to point to the matching, already stored chunk. If no matching chunk is found, backup manager 154 writes the data of the object to storage as one of chunks 164 for one of chunkfiles 162. Backup manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of backups 142, and is described in further detail below.

Each of chunkfiles 162 includes multiple chunks 164. Chunkfiles 162 may be fixed size (e.g., 8 MB) or variable size. Chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system. Any of chunkfiles 162 may be subject to a write once, ready many (WORM) lock having a WORM lock expiration time. A WORM lock for an S3 object is known as an "object lock" and a WORM lock for an object within AZURE Blob Storage is known as "blob immutability."

The process of deduplication for multiple objects over multiple backups results in chunkfiles 162 that each have multiple chunks 164 for multiple different objects associated with the multiple backups. In some examples, different backups 142 may have objects that are effectively copies of the same data, e.g., for an object of the file system that has not been modified. An object of a backup may be represented or "stored" as metadata having references to chunks that enable the object to be accessed. Accordingly, description herein to a backup "storing," "having," or "including" an object includes instances in which the backup does not store the data for the object in its native form.

The initial backup and the one or more subsequent incremental backups may each be associated with a corresponding retention period and, in some cases, a data lock period for the backup. As described above, a data management policy (not shown) may specify a retention period for a backup and a data lock period for a backup. A retention period for a backup is the amount of time for which the backup and the chunks that objects of the backup reference are to be stored before the backup and the chunks are eligible to be removed from storage. The retention period for the backup begins when the backup is stored (the backup creation time). A chunkfile containing chunks that objects of a backup reference and that are subject to a retention period of the backup, but not subject to a data lock period for the backup, may be modified at any time prior to expiration of the retention period. The nature of such a modification must be such to preserve the data referenced by objects of the backup.

A user or application associated with application system 102 may have access (e.g., read or write) to a backup that is stored in storage system 115. The user or application may delete some of the data due to a malicious attack (e.g., virus, ransomware, etc.), a rogue or malicious administrator, and/or human error. The user's credentials may be compromised and as a result, the backup that is stored in storage system 115 may be subject to ransomware. To reduce the likelihood of accidental or malicious data deletion or corruption, a data lock having a data lock period may be applied to a backup.

As described above, chunkfiles 162 may represent an object in a backup storage system (shown as "storage system 115," which may also be referred to as "backup storage system 115") that conform to an underlying architecture of backup storage system 115. Data platform 150 includes backup manager 154 that supports storing backups 142 in the form of chunkfiles 162, which interface with backup storage system 115 to store chunkfiles 162 after forming chunkfiles 162 from one or more chunks 164 of data. Backup manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

Data platform 150 and storage system 115 may reside in various cloud environments 130A-130N. For example, data platform 150 and storage system 115 may be deployed at and managed by various cloud service providers. Example cloud service providers include, e.g., AMAZON WEB SERVICES (AWS™) by AMAZON, INC., AZURE® by MICROSOFT, INC., ORACLE CLOUD™ by ORACLE, INC., and GOOGLE CLOUD PLATFORM (GCP) by GOOGLE, INC. In the example of FIG. 1A for instance, data platform 150 and storage systems 115A-115N reside in different (or, in other words, distinct) cloud environments, in this case, cloud environments 130A-130N, respectively. A cloud environment 130 where data platform 150 is deployed may be considered a primary cloud environment 130A with other cloud environments being secondary cloud environments 130B-130N.

As shown in the example of FIG. 1A, chunks 164 storing a copy (e.g., a backup) of the data of file system 153, such as files or other objects of file system 153, may be stored on multiple storage systems 115 at distinct cloud environments. Backup manager may create, update, and read chunk metadata 120 to record a current location one or more chunks 164 at one or more storage systems 115 of one or more cloud environments 130. In some examples, chunk metadata 120 may be a chunk table including rows identifying individual chunks 164 and columns identifying where each chunk 164 may be located at one or more cloud environments 130 and storage systems 115. In chunk metadata 120, a chunk 164 may be identified by a unique identifier assigned to the data of the chunk 164, such as a hash (e.g., SHA-1) or a fingerprint of the chunk 164 (e.g., the data in the chunk).

In some examples, backup manager 154 may store chunk metadata 120 locally, such as on storage system 105. In this manner, data platform 150 may access chunk metadata 120, such as during regular operation (e.g., reading or writing chunks), or chunk garbage collection by data platform 150, without causing data egress and associated data access costs.

Backup manager 154 may perform data management across multiple distinct cloud environments 130A-130N.

For example, backup manager 154 may manage a flow of data (e.g., data egress) between a first cloud environment 130B and a second cloud environment 130N. In some examples, backup manager 154 may select a particular cloud environment 130 of a plurality of cloud environments from which to access file system data, such as in the form of one or more chunks 164. Backup manager 154 may make the selection based on data access costs assigned to each cloud environment 130, such as to minimize data access costs.

For example, storage system 115A of cloud environment 130B and storage system 115N of cloud environment 130N may both store a particular chunk 164. Backup manager 154 may select storage system 115 of a cloud environment 130 that has lower data access costs relative to other cloud environments. As such, assuming for example data access costs are lower (e.g., lower data egress charges or lower latency) for cloud environment 130B compared to cloud environment 130N, backup manager 154 may read chunk 164 from storage system 115A rather than storage system 115N.

In some examples, data platform 150 may store data access costs for each cloud environment 130, such as at storage system 105. For instance, storage system 105 may store data access costs in chunk metadata 120 with individual data access costs being assigned to individual cloud environments 130, storage systems 115, or both. Backup manager 154 may determine data access costs from the stored data access costs when determine a selection of storage device 115 from which one or more chunks 164 are to be read. For example, chunk metadata 120 may indicate data egress has a lower cost (e.g., $0.09 per GB) at a first storage system 115A as compared to a second storage system 115N (e.g., $0.10 per GB). As such, backup manager 154 may read chunks 164 stored on both first and second storage systems 115A, 115N from first storage system 115A rather than the second storage system 115N.

Data access costs may, in some examples, be determined based on a cloud environment 130 where data platform 150 resides. System 190 of FIG. 1B is a variation of system 100 of FIG. 1A in that data platform 150 stores backups 142 (e.g., copies of file system data) using chunkfiles 162 stored to backup storage system 115B that resides on the same cloud environment 130D or is otherwise on premises or local to data platform 150. In some examples of system 190, storage system 115 enables users or applications to create, modify, or delete chunkfiles 162 via file system manager 152. In system 190, storage system 105 of FIG. 1B may be the local storage system used by backup manager 154 for initially storing and accumulating chunks prior to backup to storage systems 115. Though not shown, backup manager 154 may store backups 142, chunkfiles 162, and chunks 164 at storage system 105 in addition to or instead of storage system 115, regardless of whether or not storage system 105 is remote or local to data platform 150, in some examples.

In the example of FIG. 1B, backup manager 154 may assign a lower or the lowest data access cost to cloud environment 130D, where data platform 150 resides since data access costs may be low or not applicable (e.g., low latency or low cost/free of charge) for data accessed within the same cloud environment 130. As such, backup manager 154 may, in effect, prefer to read chunks 164 from storage system 115B of cloud environment 130D. For example, a particular chunk 164 may be stored at both storage system 115B and storage system 115C. Since storage system 115B resides in the same cloud environment 130D as data platform 150, backup manager 154 may read chunk 164 from storage system 115B rather than storage system 115C.

To restore a backup 142 of file system data, backup manager 154 may determine where chunks 164 of backup 142 are stored at one or more storage systems 115. For example, backup 142 of file system data may have chunks 164 stored at first storage system 115B of cloud environment 130D and at second storage system 115C of cloud environment 130E. Continuing this example, backup 142 may include a subset of chunks 164 at storage system 115B that have matching (e.g., identical) chunks 164 at storage system 115C, while other chunks 164 of backup 142 may be stored only at storage system 115C. Backup manager 154 may determine the location of each chunk 164 included in backup 142 and whether each chunk 164 has a matching chunk stored on another storage system 115 by reading chunk metadata 120.

As described above, backup manager 154 may determine storage system 115B has a lower data access cost. As such, in this example, backup manager 154 may restore backup 142 of the file system data by reading matching chunks 164 from storage system 115B, which has relatively lower data access costs, and reading other chunks of backup 142 from storage system 115C. In this manner, backup manager 154 reduces data access costs when restoring a copy of the file system data.

Figure 2:
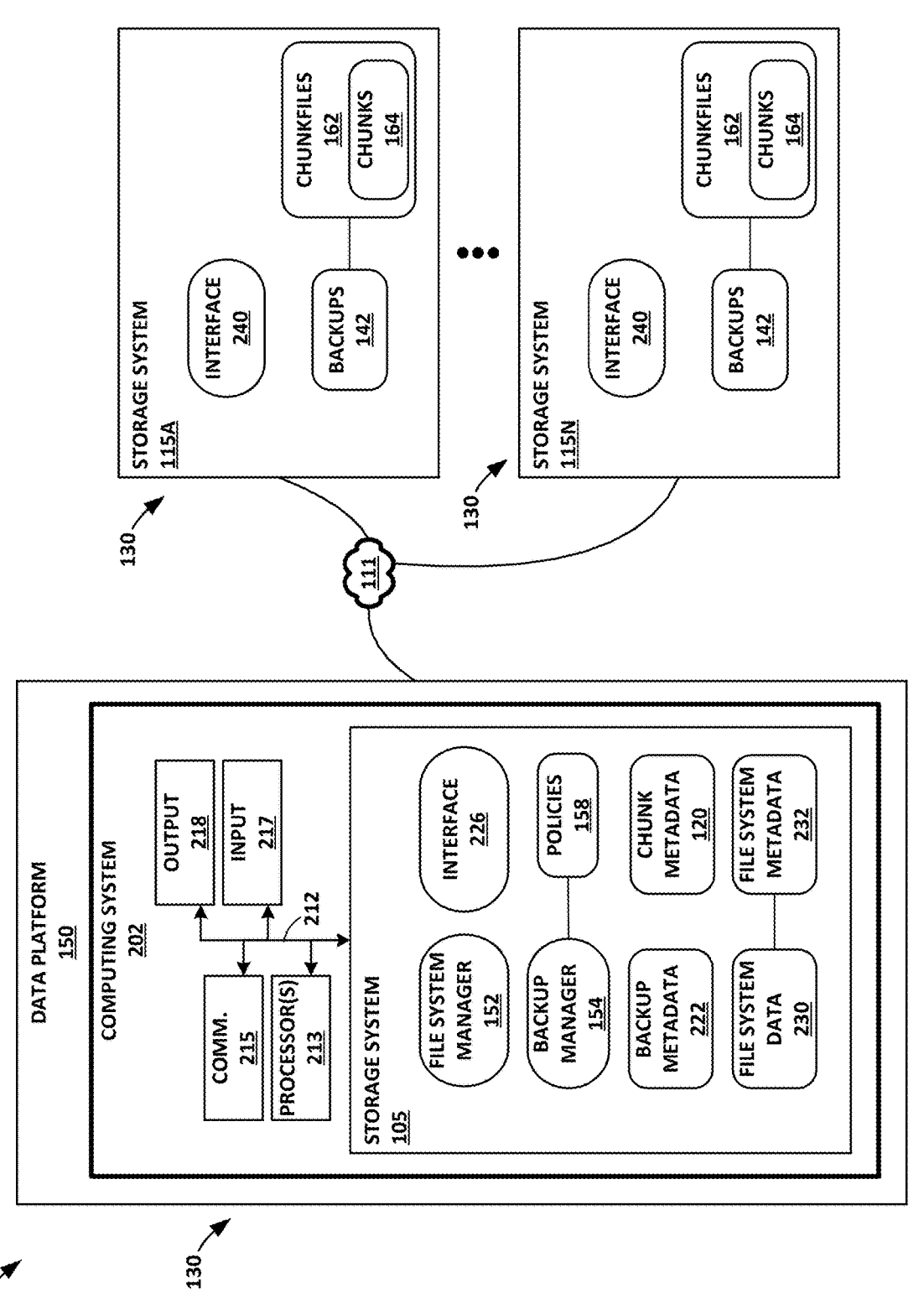
FIG. 2 is a block diagram illustrating example system that performs data management across cloud environments, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where chunkfiles 162 are written to a local storage system 115). One or more aspects of FIG. 2 may be described herein within the context of FIG. 1A and FIG. 1B.

In the example of FIG. 2, system 200 includes network 111, data platform 150 implemented by computing system 202, and backup storage systems 115. In FIG. 2, network 111, data platform 150, and storage system 115 may correspond to network 111, data platform 150, and storage system 115 of FIG. 1A. Different instances of storage system 115 may be deployed by distinct cloud service providers, the same cloud service provider, by an enterprise, or by other entities. For example, storage system 115A may be deployed in a distinct cloud environment 130 provided by a distinct cloud service provider compared to that of cloud storage system 115N.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 105. Local storage system 105 may include interface module 226, file system manager 152, and policies 158 as well as backup manager 154, checksum module 160, tree data 120, and checksums 130. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105. File system metadata 232 may include one or more trees that describe objects within file system 153 and the file system 153 hierarchy, and can be used to write or retrieve objects within file system 153. File system manager 152 may interact with and/or operate in conjunction with one or more modules of computing system 202, including interface module 226 and backup manager 154.

Backup manager 154 may perform backup functions relating to storing or creating copies of file system 153, as described above with respect to FIG. 1A, including the operations described above with respect to data management across cloud environments 130. Backup manager 154 may generate one or more backups 142 and cause file system data 230 to be stored as chunks 164 within chunkfiles 162 in backup storage system 115. Backup manager 154 may apply an adaptive deduplication process to selectively deduplicate chunks of objects within file system data 230, in accordance with one or more policies 158. Backup manager 154 may generate and manage chunk metadata 120 for generating, viewing, retrieving, or restoring any of backups 142. Backup metadata 222 may include respective original data lock periods for backups 142. Backup manager 154 may generate and manage chunk metadata 120 for generating, viewing, retrieving, or restoring objects stored as chunks 164 (and references thereto) within chunkfiles 162, for any of backups 142. Stored objects may be represented and manipulated using logical files for identifying chunks for the objects.

Local storage system 105 may store chunk metadata 120 including a chunk table that describes chunks 164. The chunk table may include respective chunk IDs for chunks 164 and may contain pointers to chunkfiles 162 and offsets within chunkfiles 162 for retrieving chunks 164 from one or more storage systems 115 of one or more cloud environments 130. Chunks 164 are written into chunkfiles 162 at different offsets. By comparing new chunk IDs to the chunk table, backup manager 154 can determine if the data already exists on the system. Backup manager 154 may use the chunk table to look up the chunkfile identifier for the chunkfile that contains a chunk.

Local storage system 105 may include a chunkfile table that describes respective physical or virtual locations of chunkfiles 162 on storage system 115, along with other metadata about the chunkfile, such as a checksum, encryption data, compression data, etc. For example, in FIG. 2, backup manager 154 may cause chunk metadata 120 including a chunkfile table to be stored to local storage system 105. Backup manager 152, optionally or in conjunction with file system manager 152, may use chunk metadata 120 to restore any of backups 142 to a file system implemented by data platform 150, which may be presented by file system manager 152 to other systems.

Interface module 226 may execute an interface by which other systems or devices may determine operations of file system manager 152 or backup manager 154. Another system or device may communicate via an interface of interface module 226 to specify one or more policies 158.

System 200 may be modified to implement an example of system 190 of FIG. 1B. In the modified system 200, chunkfiles 162 are stored to a local backup storage system 115 to support backups 142.

Interface module 240 of backup storage system 115 may execute an interface by which other systems or devices may create, modify, delete, or extend a WORM lock expiration time for any of chunkfiles 162. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of chunkfiles 162).

Figure 3A:
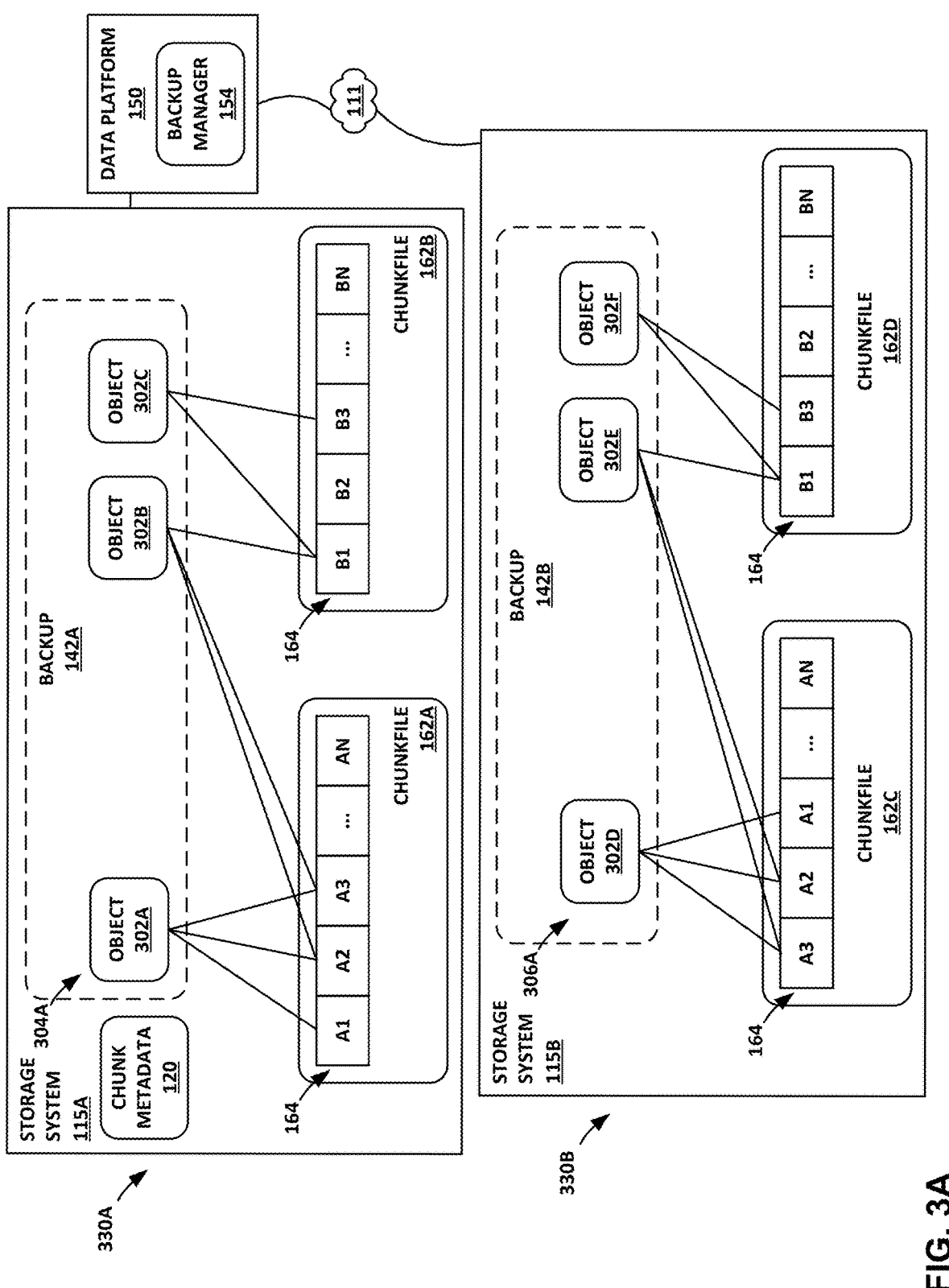
FIGS. 3A-3E are block diagrams illustrating example first and second copies of file system data, in accordance with techniques of this disclosure.

FIGS. 3A-3E are block diagrams illustrating example first and second copies of file system data, in accordance with techniques of this disclosure. As can be seen, file system data and copies 304, 306 thereof may comprise one or more objects 302, such as files. Object 302 may comprise one or more chunks 164 that contain fixed or variable portions of the data of object 302. For example, object 302 may comprise one or more chunks 164 that are 16-48 kB in size. As shown in the example of FIG. 3A for instance, object 302A comprises chunks A1-A3 of chunkfile 162A and object 302C comprises chunks B1 and B2 of chunkfile 162B. Object 302 may comprise chunks 164 in different chunkfiles 162 in some examples. For instance, object 302B comprises chunks A2 and A3 of chunkfile 162A and chunk B1 of chunkfile 162B. In some examples, chunk metadata 120 may include one or more tree data structures that represent objects 302 where one or more nodes of a tree data structure includes pointers to individual chunks 164 of object 302.

Though described primarily as being stored on storage system 115, first copy 304, second copy 306, or both may be stored on other storage systems, such as local storage system 105 described above. One or more storage systems 115 may reside in distinct cloud environments 330. Cloud environments 330 may be an example of cloud environment 130 described above with respect to FIGS. 1A-2. First copy 304, second copy 306, or both may constitute a backup 142 of file system data or, as indicated by the broken line illustration of backup 142, may alternatively be an archive, or other replica, clone, or copy of file system data in some examples.

Backup manager 154 may backup, replicate, clone, or otherwise copy first copy 304 to create second copy 306. For instance, in the example of FIG. 3A, objects 302D, 302E,

302F of second copy 306A are copies of objects 302A, 302B, 302C of first copy 304, respectively. As can be seen, object 302A of first copy 302A and object 302D of second copy 306A (e.g., the copy of object 302A) includes chunks A1-A3. Likewise, object 302B and object 302E (e.g., the copy of object 302B) both include chunks A2, A3, B1 and object 302C and object 302F (e.g., the copy of object 302C) both include chunks B1, B3. As can be seen, in FIG. 3A, chunks 164 of a particular object 302 may be at distinct offsets, distinct chunkfiles 162, or both between first copy 304 and second copy 306. For instance, object 302A and object 302D comprise the same chunks A1-A3; however, chunks A1, A3 are not at the same location (e.g., offset) in second copy 306A as compared to first copy 304A. Likewise, chunks B1, B3 of objects 302C, 302F are not at the same location in second copy 306A as compared to first copy 304A.

To restore second copy 306 to a file system of data platform 150, backup manager 154 may identify chunks 164 included in each object 302 of second copy 306. Backup manager 154 may identify chunks 164 for each object 302 using a tree data structure of chunk metadata 120 that links object 302 to one or more chunks 164 for examples. Additional examples and techniques for storage and retrieval of file system data in a tree structure and one or more chunks are described in "MAINTAINING AND UPDATING A BACKUP VIEW OF AN APPLICATION AND ITS ASSOCIATED OBJECTS," U.S. patent application Ser. No. 17/960,515, filed Oct. 5, 2022, the entire contents of which are hereby incorporated by reference.

Backup manager 154 may determine whether chunk 164 has a matching chunk (e.g., an identical chunk) in first copy 304, for example, via a chunk table of chunk metadata 120. As shown by the broken lines in the example of FIG. 3B, objects 302 of second copy 306 in second storage system 115B may have chunks 164 with a matching chunk 164 in first storage system 115A. An example chunk table, Table 1, identifying the location of chunks 164 and their matching chunks 164 at first storage system 115A and second storage system 115B with respect to the example of FIG. 3B follows.

TABLE 1

| Chunk ID | Storage System 115A | Storage System 115B |
|---|---|---|
| A1 | Chunkfile 162A, Offset 1 | Chunkfile 162C, Offset 3 |
| A2 | Chunkfile 162A, Offset 2 | Chunkfile 162C, Offset 2 |
| A3 | Chunkfile 162A, Offset 3 | Chunkfile 162C, Offset 1 |
| B1 | Chunkfile 162B, Offset 1 | Chunkfile 162D, Offset 1 |
| B2 | Chunkfile 162B, Offset 2 | Chunkfile 162D, Offset 3 |
| B3 | Chunkfile 162B, Offset 3 | Chunkfile 162D, Offset 2 |

In the examples of FIGS. 3A-3E, first copy 304 is stored on first storage system 115A which resides in cloud environment 330A, where data platform 150 also resides, whereas cloud environment 330B where first storage system 115B resides is a separate cloud environment. As such, backup manager 154 may determine data access costs are lower for first storage system 115A and retrieve matching chunks 164 from first storage system 115A when restoring second copy 306 from second storage system 115B to a file system of data platform 150. In some examples, first storage system 115A may be considered a "primary storage system" since it shares a cloud environment with data platform 150, while one or more second storage systems 115B are considered "secondary storage systems" as they do not share a cloud environment with data platform 150. In some examples, first storage system 115A may be considered a "primary storage system" when first storage system 115A has a lower data access cost as compared to secondary storage systems (e.g., one or more second storage systems 115B) of data platform 150.

First copy 304 may commonly not include one or more chunks 164 for objects 302 of second copy 306, such as when first copy 304 changes. In some examples, first copy 304 may be subject to different backup policies 158 as compared to second copy 306 and thus may change at different times (more or less frequently) relative to second copy 306. FIG. 3C illustrates an example of restoring second copy 306A after one or more changes to first copy 304A of FIGS. 3A-3B have occurred. As shown in first copy 304B of FIG. 3C, object 302A now includes chunk A4 instead of chunk A1 and object 302C now includes chunk B4 instead of B3. Chunks A1, B3 may no longer exist, such as due to garbage collection by backup manager 154, whereby chunks 164 which are no longer part of any object 302 are deleted.

Figure 3B:
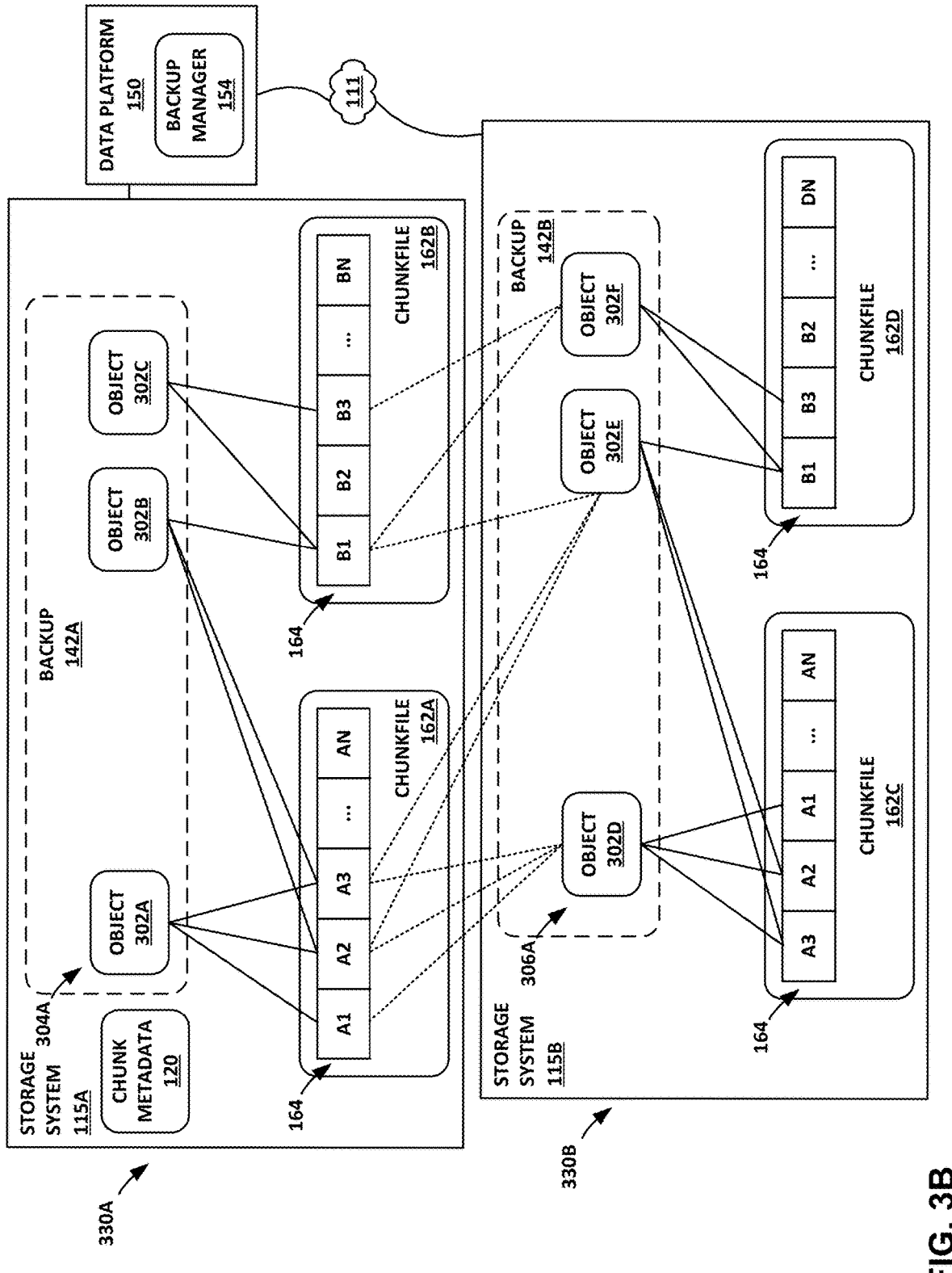
Figure 3C:
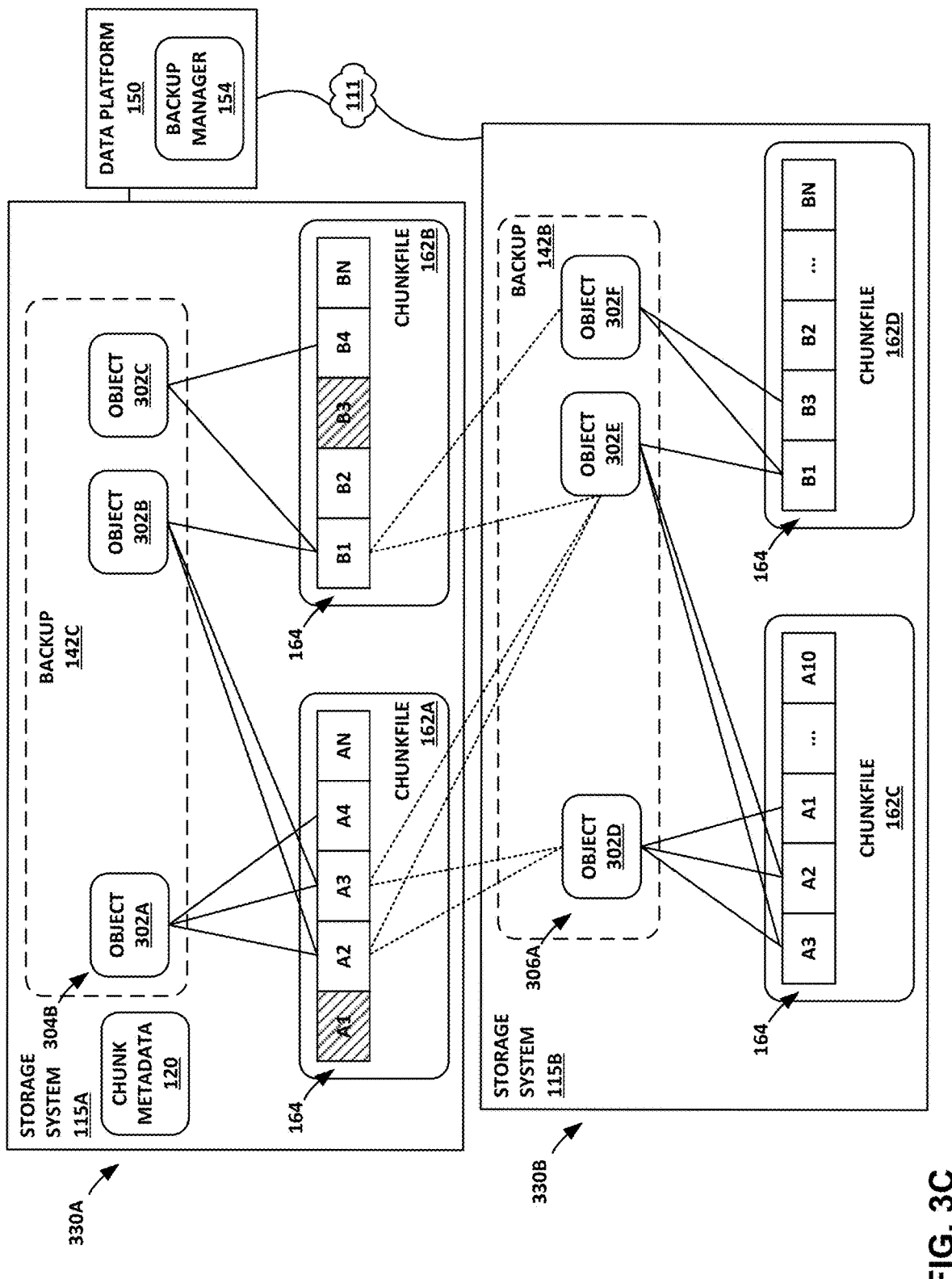

As can be seen second copy 306A of FIG. 3C is still a copy of first copy 304A of FIGS. 3A-3B (e.g., a copy of an earlier version of the file system data). When restoring second copy 306, backup manager 154 may determine matching chunks 164 in first copy 304 as described above. As shown by the following example chunk table, in the example of FIG. 3C, object 302D still has matching chunks A2, A3 in first copy 304B, object 302E has the same matching chunks A2, A3, B1 in first copy 304B as before, and object 302F still has matching chunk B1 in first copy 304B.

TABLE 2

| Chunk ID | Storage System 115A | Storage System 115B |
|---|---|---|
| A1 | | Chunkfile 162C, Offset 3 |
| A2 | Chunkfile 162A, Offset 2 | Chunkfile 162C, Offset 2 |
| A3 | Chunkfile 162A, Offset 3 | Chunkfile 162C, Offset 1 |
| A4 | Chunkfile 162A, Offset 4 | |
| B1 | Chunkfile 162B, Offset 1 | Chunkfile 162D, Offset 1 |
| B2 | Chunkfile 162B, Offset 2 | Chunkfile 162D, Offset 3 |
| B3 | | Chunkfile 162D, Offset 2 |
| B4 | Chunkfile 162B, Offset 4 | |

Assuming, for example, a lower data access cost at cloud environment 330A, to restore second copy 306A, backup manager 154 may retrieve matching chunks A2, A3, B1 from first storage system 115A rather than from second storage system 115B even though second storage system 115B stores identical matching chunks A2, A3, B1. In this manner, backup manager 154 reduces data egress from second storage system 115B and accordingly minimizes data access costs.

Figure 3D:
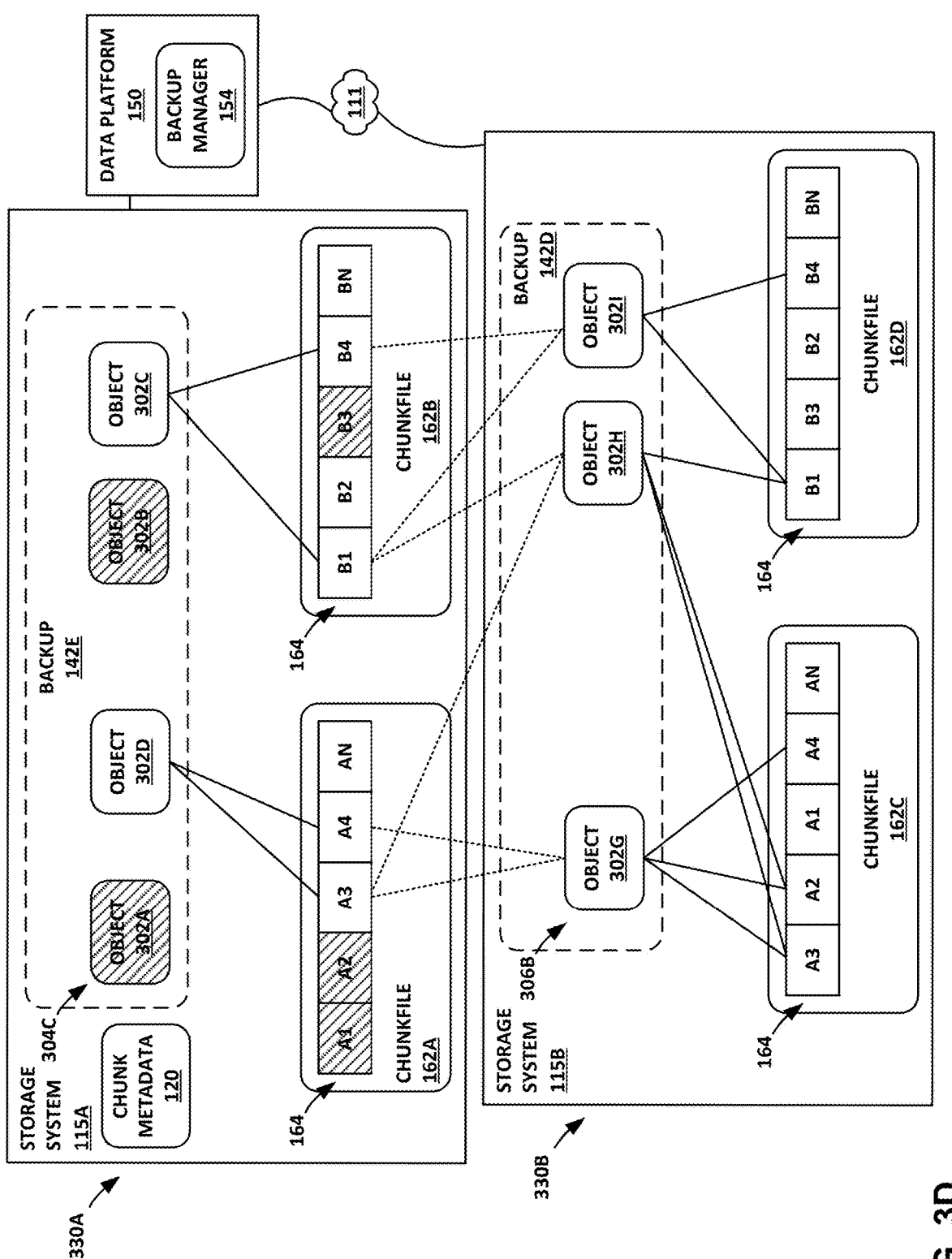

Multiple copies 306 may be stored by backup manager 154 representing distinct copies (e.g., backups 142 or archives) of file system data at different points in time. FIG. 3D illustrates an example of a distinct second copy 306B (e.g., backup 142C or archive) stored on second storage system 115B. As can be seen, second copy 306B is a copy of first copy 304B of FIG. 3C and therefore differs from second copy 306A. In the example of FIG. 3D, objects 302A, 302B have been deleted, object 302D has been added, and chunk A2 has been deleted (e.g., garbage collected) corresponding to the deletion of objects 302A, 302B at first storage system 115A.

As can be seen form the following example chunk table, Table 3, for the example of FIG. 3D, to restore second copy 306B, assuming first storage system 115A has a lower data access cost, backup manager 154 may retrieve matching chunks A3, A4, B1, B4 from first storage system 115A rather than second storage system 115B when restoring second copy 306B to a file system of data platform 150.

TABLE 3

| Chunk ID | Storage System 115A | Storage System 115B |
|---|---|---|
| A1 | | Chunkfile 162C, Offset 3 |
| A2 | | Chunkfile 162C, Offset 2 |
| A3 | Chunkfile 162A, Offset 3 | Chunkfile 162C, Offset 1 |
| A4 | Chunkfile 162A, Offset 4 | Chunkfile 162C, Offset 4 |
| B1 | Chunkfile 162B, Offset 1 | Chunkfile 162D, Offset 1 |
| B2 | Chunkfile 162B, Offset 2 | Chunkfile 162D, Offset 3 |
| B3 | | Chunkfile 162D, Offset 2 |
| B4 | Chunkfile 162B, Offset 4 | Chunkfile 162D, Offset 4 |

Figure 3E:
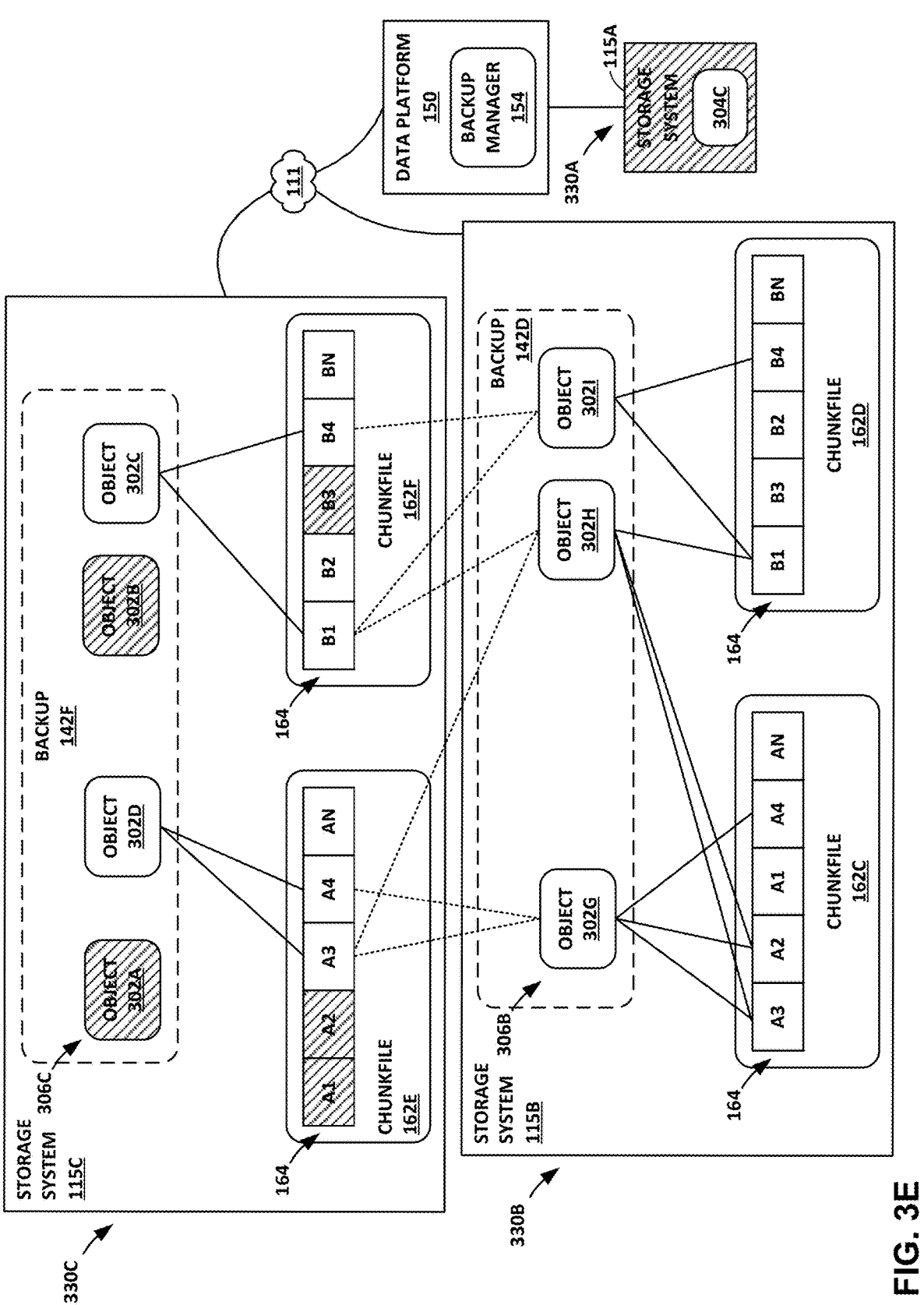

During operation of data platform 150, cloud environments 330, storage systems 115A, copes 304, 306, or various subsets thereof, may be damaged, deleted, offline, or otherwise become unavailable. As shown in the example of FIG. 3E for instance, first storage system 115A has become unavailable thereby making first copy 304C unavailable to data platform 150. Data platform 150 may restore file system data from one or more second copies 306, such as in the event first copy 304 is unavailable.

For example, to restore second copy 306B, data platform 150 may determine which of second storage systems 115B, 115C has a lower data access cost. Assuming, for example, second storage system 115C has a lower data access cost and because first storage system 115A is unavailable, data platform 150 may restore second copy 306B by retrieving matching chunks from second copy 306C stored on second storage system 115C rather than second storage system 115B. In the example of FIG. 3E for instance, backup manager 154 may retrieve matching chunks A3, A4, B1, B4 from second storage system 115C, while retrieving chunk A1 from second storage system 115B, to restore second copy 306B.

Chunk metadata 120 may include data (e.g., a column) for one or more first and second storage systems 115 of data platform 150 which backup manager 154 may utilize to locate chunks 164 during restoration. For example, the chunk table of Table 3 above may include data for storage system 115C, such as shown below in the example chunk table of Table 4. Data platform 150 may utilize chunk metadata 120 to locate chunks 164 at various first and second storage systems 115 during the restoration process. In the event, a particular chunk 164 is unavailable at a particular storage system 115, data platform 150 may utilize chunk metadata 120 to locate the particular chunk at another storage system 115. For example, data platform 150 may utilize chunk metadata 120 to determine matching chunks A3, A4, B1, B4 are available from second storage system 115C and locate matching chunks A3, A4, B1, B4 at second storage system 115C when first storage system 115A is unavailable.

TABLE 4

| Chunk ID | Storage System 115C |
|---|---|
| A1 | |
| A2 | |
| A3 | Chunkfile 162E, Offset 3 |
| A4 | Chunkfile 162E, Offset 4 |

TABLE 4-continued

| Chunk ID | Storage System 115C |
| --- | --- |
| B1 | Chunkfile 162F, Offset 1 |
| B2 | Chunkfile 162F, Offset 2 |
| B3 | |
| B4 | Chunkfile 162F, Offset 4 |

FIG. 4 is a flowchart illustrating an example mode of operation for a data platform to perform data management across cloud environments, in accordance with techniques of this disclosure. FIG. 4 is described below in the context of FIGS. 3A-3E. As can be seen from the example of FIG. 4, data platform 150 may store a plurality of chunks 164 with a first subset of chunks 164 storing data for one or more objects 302 of a file system and one or more second subsets of chunks 164 storing data for one or more copies 306 of the objects 302 (402). With reference to the example of FIG. 3A for instance, the first subset may comprise objects 302A, 302B, 302C and the second subset may comprise objects 302D, 302E, 302F, which may respectively be copies of objects 302A, 302B, 302C. In some examples, a copy of objects 302 may represent a backup 142, archive, or other copy of the objects at a particular time.

The first subset may be stored on a first storage system 115A and the one or more second subsets may be stored on one or more second storage systems 115B. In the example of FIG. 3A for instance, chunks A1-A3 in first storage system 115A store data for objects 302A, 302B, 302C while chunks A1-A3 in second storage system 115B store data for copies (e.g., objects 302D, 302E, 302F) of objects 302A, 302B, 302C. In some examples, first storage system 115A may be local to data platform 150 while one or more second storage systems 115B are remote from data platform 150. First storage system 115A may be a storage system residing on the same cloud environment 330A as data platform 150 for instance.

In some examples, first storage system 115A and one or more second storage systems 115B may be deployed to or otherwise provided by distinct cloud service providers 330. In such case, retrieving chunk 164 from second storage systems 115B may be associated with a higher data access cost than retrieving matching chunk 164 from first storage system 115A. Likewise, locating chunk 164 in second storage systems 115B may be associated with a higher data access cost than locating the matching chunk 164 from the first storage system 115B.

Data platform 150 may store chunk metadata 120 for the first subset and the second subsets of chunks 164 (404). As described above, chunk metadata 120 may describe a location for each chunk 164 in first storage system 115A and second storage systems 115B. For example, chunk metadata 120 may comprise a chunk table identifying individual chunks 164 and their location at first storage system 115A and second storage systems 115B. In some examples, data platform 150 may store chunk metadata 120 on first storage system 115A, such as to avoid data egress when data platform 150 accesses chunk metadata 120.

As described above, second storage system 115B may store one or more copies of file system data representing the file system data at various points in time. For instance, referring to the examples of FIGS. 3C-3D, second copies 306A, 306B may both be stored on second storage system 115B with second copy 306A being a copy of file system data at a first time and second copy 306B being a copy of the file system data at a different second time.

Data platform 150 may restore individual copies of file system data stored on one or more second storage systems 115B. In some examples, data platform 150 may restore a selected copy 306 of the file system data from one or more second storage systems 115B (406) by performing one or more processes (e.g., identification, determination, or retrieval) for each chunk 164 of the selected copy. Selected copy 306 may be selected from one or more copies (e.g., backups 142 or archives) of file system data stored on one or more second storage systems 115B. For example, a copy 306 of file system data for a particular point in time may be selected for restoration, such as by a user. In some examples, data platform 150 may receive a selection or indication of selected copy 306, such as from a user, via an input device 217.

In some examples, for each chunk 164 of selected copy 306, data platform 150 may identify chunk 164 in chunk metadata 120 (408). For instance, data platform 150 identify chunk 164 using a chunk ID, such as a name, hash, fingerprint, or other identifier for chunk 164, within a chunk table of chunk metadata 120. Data platform 150 may determine whether a matching chunk 164 is stored on first storage system 115A based on the chunk metadata (410). Referring to the example of FIG. 3C for instance, data platform 150 may identify chunks 164 in selected copy 306A using the chunk table in Table 2 above. As can be seen, chunks A2, A3, B1 of selected copy 306A have matching chunks A2, A3, B1 in first storage system 115A.

Responsive to determining matching chunk 164 is stored on first storage system 115A, data platform 150 retrieve matching chunk 164 from first storage system 115A and include matching chunk 164 in the selected copy (412). Data platform 150 may locate matching chunk 164 on first storage system 115A using chunk metadata 120. Continuing the example of FIG. 3C for instance, data platform 150 may retrieve matching chunks A2, A3, B1 from first storage system 115A. Data platform may retrieve chunks A2, A3, B1 as part of selected copy 306A, such to restore selected copy 306A to a file system.

Responsive to determining matching chunk 164 is not stored on first storage system 115A, data platform 150 may retrieve chunk 164 from one or more second storage systems 115B and included chunk 164 in the selected copy (414). As described above, data platform 150 may locate chunk 164 in one or more second storage systems 115B using chunk metadata 120. With respect to the example of FIG. 3C, data platform 150 may retrieve chunks A1, B3 of selected copy 306A from second storage system 115B and include chunks A1, B3 as part of selected copy 306A. As such, at step 414, selected copy 306A includes chunks A1, A2, A3, B1, B3 and may be considered restored in that chunks 164 for each object 302 in selected copy 306A have been restored.

Data platform 150 may store selected copy 306 on first storage system 115A or one or more second storage systems 115B to restore the selected copy to a file system of first storage system 115A or one or more second storage systems 115B, such as to replace or repair a damaged or deleted file system using with selected copy 306. For example, after storing selected copy 306A of the example of FIG. 3C to first storage system 115A, first storage system 115A may include objects 302 and chunks 164 as shown in first storage system 115A of FIG. 3A.

Although the techniques described in this disclosure are primarily described with respect to a backup function performed by a backup manager of a data platform, similar techniques may additionally or alternatively be applied for an archive, replica, clone, or snapshot functions performed by the data platform. In such cases, backups 142 would be archives, replicas, clones, or snapshots, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:

storing, by a data platform implemented by a computing system, a first plurality of chunks storing data for an object of a file system and a second plurality of chunks storing data for a copy of the object, wherein the first plurality of chunks are stored on a first storage system and the second plurality of chunks are stored on one or more second storage systems;

storing, by the data platform, chunk metadata for both the first plurality of chunks and the second plurality of chunks at the first storage system that is deployed local to the computing system that implements the data platform; and restoring, by the data platform, a selected copy of the one or more copies from the one or more second storage systems by, for each chunk of the selected copy:

identifying, by the data platform and from the chunk metadata, a data access cost for restoring a matching chunk, that matches the chunk, from the first storage system, wherein the data access cost differs based on whether restoring the matching chunk from the first storage system includes a data egress from a different computing system to the computing system that implements the data platform;

determining, by the data platform, whether the data access cost for restoring the matching chunk from the first storage system is lower than that of restoring the chunk from the one or more second storage systems;

responsive to determining that the data access cost for restoring the matching chunk from the first storage system is lower than that of restoring the chunk from the second storage system, retrieving, by the data platform, the matching chunk from the first storage system, wherein the matching chunk is included in the selected copy; and responsive to determining that the data access cost for restoring the matching chunk from the first storage system is not lower than that of restoring the chunk from the second storage system, retrieving, by the data platform, the chunk from the one or more second storage systems, wherein the chunk is included in the selected copy.

2. The method of claim 1, further comprising, after restoring the selected copy, storing, by the data platform, the selected copy on a storage system selected from one or more of the first storage system and the one or more second storage systems.

3. The method of claim 1, wherein each of at least a subset of the one or more copies represents a backup of the object for a particular time.

4. The method of claim 1, wherein the one or more second storage systems are deployed to the different computing system.

5. The method of claim 1, wherein each of the first storage system and the one or more second storage systems are provided by distinct cloud service providers.

6. The method of claim 5, wherein retrieving the chunk from the one or more second storage systems is associated with a higher cost than retrieving the matching chunk from the first storage system.

7. The method of claim 5, further comprising locating the chunk in the one or more second storage systems is associated with a higher cost than locating the matching chunk from the first storage system.

8. The method of claim 1, further comprising receiving, by the data platform, an indication of the selected copy via an input device.

9. A computing system comprising:

a memory storing instructions; and processing circuitry that executes the instructions to:

store a first plurality of chunks storing data for an object of a file system and a second plurality of chunks storing data for a copy of the object, wherein the first plurality of chunks are stored on a first storage system and the second plurality of chunks are stored on one or more second storage systems;

store chunk metadata for the first plurality of chunks and the second plurality of chunks at the first storage system that is deployed local to the computing system that implements a data platform; and restore a selected copy of the one or more copies from the one or more second storage systems by, for each chunk of the selected copy:

identify, from the chunk metadata, a data access cost for restoring a matching chunk, that matches the chunk, from the first storage system, wherein the data access cost differs based on whether restoring the matching chunk from the first storage system includes a data egress from a different computing system to the computing system;

determine whether the data access cost for restoring the matching chunk from the first storage system is lower than that of restoring the chunk from the one or more second storage system;

responsive to determining that the data access cost for restoring the matching chunk from the first storage system is lower than that of restoring the chunk from the second storage system, retrieve the matching chunk from the first storage system, wherein the matching chunk is included in the selected copy; and responsive to determining that the data access cost for restoring the matching chunk from the first storage system is not lower than that of restoring the chunk from the second storage system, retrieve the chunk from the one or more second storage systems, wherein the chunk is included in the selected copy.

10. The computing system of claim 9, wherein the processing circuitry further executes the instructions to, after restoring the selected copy, store the selected copy on a storage system selected from one or more of the first storage system and the one or more second storage systems.

11. The computing system of claim 9, wherein each of at least a subset of the one or more copies represents a backup of the object for a particular time.

12. The computing system of claim 9, wherein the one or more second storage systems are deployed to the different computing system.

13. The computing system of claim 9, wherein each of the first storage system and the one or more second storage systems are provided by distinct cloud service providers.

14. The computing system of claim 13, wherein retrieving the chunk from the one or more second storage systems is associated with a higher cost than retrieving the matching chunk from the first storage system.

15. The computing system of claim 13, further comprising locating the chunk in the one or more second storage systems is associated with a higher cost than locating the matching chunk from the first storage system.

16. The computing system of claim 9, wherein the processing circuitry further executes the instructions to receive an indication of the selected copy via an input device.

17. A non-transitory computer-readable storage medium comprising instructions that, when executed, cause processing circuitry of a computing system to:

store a first plurality of chunks storing data for an object of a file system and a second plurality of chunks storing data for a copy of the object, wherein the first plurality of chunks are stored on a first storage system and the second plurality of chunks are stored on one or more second storage systems;

store chunk metadata for the first plurality of chunks and the second plurality of chunks at the first storage system that is deployed local to the computing system that implements a data platform; and restore a selected copy of the one or more copies from the one or more second storage systems by, for each chunk of the selected copy:

identify, from the chunk metadata, a data access cost for restoring a matching chunk, that matches the chunk, from the first storage system, wherein the data access cost differs based on whether restoring the matching chunk from the first storage system includes a data egress from a different computing system to the computing system;

determine whether the data access cost for restoring the matching chunk from the first storage system is lower than that of restoring the chunk from the one or more second storage system;

responsive to determining that the data access cost for restoring the matching chunk from the first storage system is lower than that of restoring the chunk from the second storage system, retrieve the matching chunk from the first storage system, wherein the matching chunk is included in the selected copy; and responsive to determining that the data access cost for restoring the matching chunk from the first storage system is not lower than that of restoring the chunk from the second storage system, retrieve the chunk from the one or more second storage systems, wherein the chunk is included in the selected copy.

18. The computer-readable storage medium of claim 17, wherein, when further executed, the instructions cause the processing circuitry of the computing system to, after restoring the selected copy, store the selected copy on a storage system selected from one or more of the first storage system and the one or more second storage systems.

* * * * *